United States Patent [19]

Hadni et al.

[11] 3,820,088

[45] June 25, 1974

[54] FERROELECTRIC MEMORIES, AND METHOD OF ACTIVATING THE SAME

[75] Inventors: Armand Hadni, Nancy; Robert Thomas, Saint-Die, both of France

[73] Assignee: Agence Nationale De Valorisation De La Recherche (Anvar), Courbevoie, France

[22] Filed: July 20, 1972

[21] Appl. No.: 273,531

[30] Foreign Application Priority Data

July 23, 1971 France..........................71.27044

[52] U.S. Cl. ........................ 340/173.2, 340/173 LS

[51] Int. Cl. ........................ G11c 11/22, G11c 11/42

[58] Field of Search .................... 340/173.2, 173 LS

[56] References Cited

UNITED STATES PATENTS

| | | | |
|---|---|---|---|
| 3,229,261 | 1/1966 | Fatuzzo | 340/173.2 |
| 3,693,171 | 9/1972 | Asam | 340/173.2 |
| 3,701,121 | 10/1972 | Fraser | 340/173.2 |
| 3,702,215 | 11/1972 | Cummins | 340/173.2 |
| 3,703,328 | 11/1972 | Glass | 340/173.2 |

OTHER PUBLICATIONS

Taylor, Utilization of the J*Partial Switching Properties of Ferroelectrics in Memory Devices, IEEE Transactions on Electronic Computers, Vol. EC–14, No. 6, 12/65, pp. 881–886

Schaffert, Photostorage System, IBM Technical Disclosure Bulletin, Vol. 5, No. 3, 8/62, pp. 54–56

*Primary Examiner*—Bernard Konick
*Assistant Examiner*—Stuart N. Hecker
*Attorney, Agent, or Firm*—William D. Stokes

[57] ABSTRACT

The invention relates to high-capacity memory devices permitting non-destructive reading. The memory (FIG. 4 ) comprises a plate 11 made of ferroelectric material with a very thin metallized film 15 thereon to absorb the radiation from a laser beam, and a thicker metallized film 16. The source 18 allows the orientation of all the ferroelectric domains. A second source 19, in combination with laser scanning, permits writing into the memory device. Reading is effected by scanning with the laser and detecting the direction of current flow through the resistor 20. For use as memory devices in computers.

9 Claims, 5 Drawing Figures

FERROELECTRIC MEMORIES, AND METHOD OF ACTIVATING THE SAME

The present invention relates to memories, that is to physical systems for storing information, and to a method of activating such memories.

It is well-known that computers, telephone exchanges and other data or information processing systems are dependent on the memory or memories used. The performance characteristics of such systems depend on the capacity, speed and reliability of their memories.

Current high-speed memories of the magnetic core or integrated circuit type have the disadvantage of being relatively expensive when it is required to store a large amount of data, as it is often the case. For instance, a ferrite core memory costs approximately 0.04 francs per binary unit of information, or bit.

It has already been proposed to utilize ferroelectric memories (ferroelectricity being substantially the transposition of magnetism into the realm of electricity, with a ferroelectric material corresponding to a ferromagnetic material), but hitherto such memories have had two drawbacks, namely of having only relatively small capacity and of involving destructive reading (the bit read being erased); in addition, their cost per bit is high, this being inherent in their design.

Figure 1:
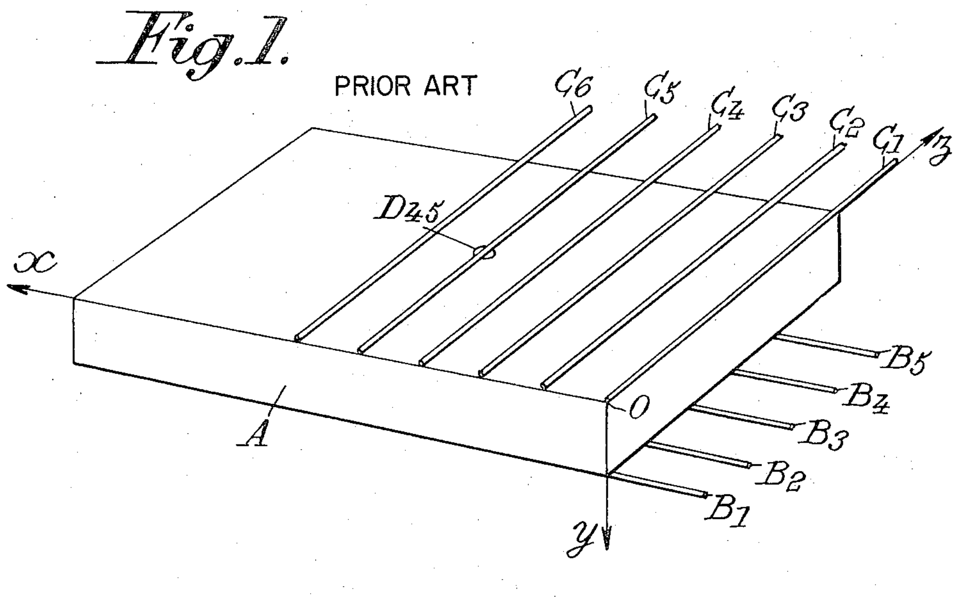

FIG. 1 in the accompanying drawings is an isometric perspective showing an embodiment of a known type of ferroelectric memory. This memory consists basically of a plate A made of a ferroelectric material, following a generally rectangular shape along mutually perpendicular axes oxyz and cut at right angles to its ferroelectric axis oy, and two systems of parallel conductors, of which one (the system of conductors $B_1$, $B_2$, $B_3$ . . . ) is parallel to the axis ox and the other (the system of conductors $C_1$, $C_2$. $C_3$ . . .) is parallel to the axis oz, these two systems being applied to the bottom and top surfaces respectively of the plate A. There was thereby determined on the plate A a matrix of prisms (also known as domains) of axis oy, such as the prism $D_{45}$ between conductor $B_4$ and conductor $C_5$.

If a voltage of given value is applied across conductors $B_4$ and $C_5$, the conductor $B_4$ being at a positive potential, the prism $D_{45}$ will be subjected to an electric field acting in the direction $\overrightarrow{oy}$ and will therefore be polarized in the direction $\overrightarrow{oy}$, which by definition corresponds to writing a "1" in the matrix memory with *n.m* positions, where *n* is the number of conductors B and *m* the number of conductors C. Contrariwise, prisms initially polarized along $\overrightarrow{yo}$ represent a "0".

In such a memory, reading was done by creating in the prism $D_{45}$ an electric field of opposite sense to the writing sense by applying a voltage of opposite polarity across the conductors $B_4$ and $C_5$ and then detecting the current produced by the reversal in the polarization of this prism when a "1" was written. But since in ferroelectricity there is unfortunately no real coercive force as in ferromagnetism, the application of a weak field in the reverse sense ($\overrightarrow{yo}$), if applied for a long time or in repeated pulses, sometimes caused a definitive switching of the ferroelectric domain of that particular prism and the consequent erasure of the "1" written. The reading process — if repeated at any rate — was consequently destructive. In short, a memory device of this type was volatile, which is of course a serious drawback.

It has recently been discovered that certain ferroelectric materials like glycine sulfate experience only a partial and momentary switching provided that the reverse electric field is applied for a period of time not exceeding a critical value called $t^*$ (G.W. Taylor — Utilization of the $t^*$ Partial Switching Properties of Ferroelectrics in Memory Devices — IEEE Trans. on Electronic Computers, Vol. EC-14, No. 6 (1965) 881). Consequently, individual readings of such a ferroelectric material are made by applying the reverse reading field for a time lapse less than $t^*$. Several readings can be made without erasure. However, this technique requires not only highly sensitive and very-short-response reading means (to permit detection of the reading signal during the very short reading time, less than $t^*$), but above all the existence of systems of B and C conductors, resulting in a limitation of the number of bits which can be written on a given surface and in high cost (since it is necessary to be able to apply the voltages selectively across a given conductor B and a given conductor C). For this reason, ferroelectric memories, and even those which apply the $t^*$ principle, have not come into wide use.

It is the object of the present invention to overcome the above-mentioned disadvantages by providing a simple ferroelectric memory offering high bit density per square centimetre (being devoid of the two orthogonal arrays of conductors), nondestructive reading, and sensitivity without, in principle, applying a voltage liable to switch the polarization of the different prisms. Such a memory is furthermore fast and reliable.

A memory device according to this invention can also be used for displaying and storing images.

The subject ferroelectric memory of this invention is characterized in that it comprises, in combination, a thin plate made of a ferroelectric material cut at right angles to its ferroelectric axis and metallized over its two large faces perpendicular thereto, means for applying across said two faces, when required, a first or a second voltage of different values and opposite sense, a load resistor connectable across the two metallized faces of the plate, means for focusing the spot of a laser beam of desired intensity into one of the two metallized faces of the plate (hereinafter referred to as the active face) and for scanning said active face of the plate with said spot, the laser beam being utilized both for writing and reading information on said memory, and means for detecting the flow and direction of a current through said resistor when the same is connected across said two faces.

Preferably, the second voltage, which is directed in the opposite direction to the first voltage, has a value slightly less than a value corresponding to the coercive force for which the polarizations of the elemental plate domains would be switched, the intensity of the laser beam concentrated on one of the domains allowing of reducing the coercive force, during application of said second voltage, until the polarization of the illuminated domain is switched.

The method of utilizing such a memory for writing and reading information thereon in the form of binary digits 0 or 1 is characterized in that it includes the steps of:

- applying the first voltage of higher value across the metallized faces whereby to polarize all the ferroelectric domains of the plate in the same sense, writing one of the two binary digits by applying, on the one hand, the second voltage of opposite sense to the first voltage across the metallized faces and, on the other, the spot of the laser beam upon that memory cell of the active face on which said binary digit is to be written, whereby to switch the ferroelectric domain beneath said spot from its previous sense of polarization to the opposite sense of polarization.

- and reading the memory by applying the laser beam to the memory cell to be read and by connecting said resistor across the two metallized faces whereby to cause a current to flow through said resistor, the direction of this current, which is a function of the sense of polarization of the ferroelectric domain beneath the cell, indicating in binary digit written on said cell, and reading being effected through the agency of the means for detecting the flow and direction of a current.

The binary digit 1 may be assigned for example to the memory cells or points which have received the laser spot and the polarization sense of the associated ferroelectric domain of which has accordingly been switched. Hence the digit 0 will correspond to those domains which have retained their initial sense of polarization, that is to say to the cells or points which have not received the laser spot.

Indeed, the inventors were surprised to note that if the following were simultaneously applied to a plate of triglycine sulfate (the two faces at right angles to the ferroelectric axis of which are each coated with a metallization film, one of the films being thin enough to absorb the radiation, and the ferroelectric domains of which are polarized in the same direction and the same sense):

- an intense illumination localized on the plate face covered with the thin absorbent film,

- and a voltage of appropriate value and sense across the two matallization films, then the polarization sense of that domain would be switched. If it is postulated by definition that the laser beam is actually applied, i.e., not occluded, when it is required to write a "1", then in may be said that the switching of a domain corresponds to writing a "1." Contrariwise, occluding the laser beam in the course of its scan will cause a "0" to be written and in such cases the domain will not be switched even if said voltage exists (since the intense illumination and application of the voltage are needed simultaneously to switch a domain).

Further, the inventors have noted that if, after the desired ones or zeros have been written on the different cells of the plate, each of these cells or points is illuminated in succession at the same time as a resistor (rated at approximately 1,000 ohms, for example) is connected across the two metallization films, then the resistor will be crossed by an electric current the direction of which depends on the sense of the polarization of the domain illuminated at that instant by the laser spot. Thus it becomes extremely easy to feed each memory cell by means of a device which detects the flow and direction of the current through said resistor.

The inventors have furthermore observed that the memory functions under optimum conditions for both writing and reading when the laser beam is modulated.

The description which follows with reference to the accompanying non-limitative exemplary drawings will give a clear understanding of how the invention can be carried into practice.

Figure 2:
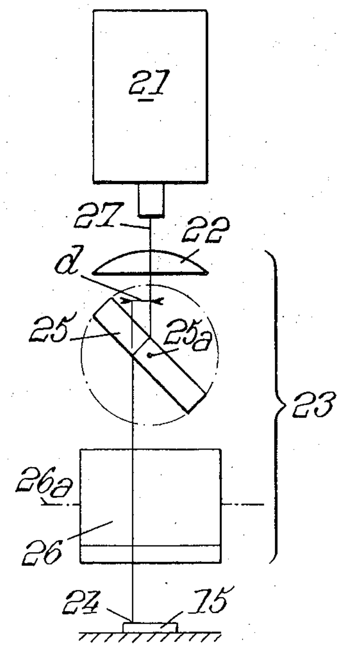
Figure 3:
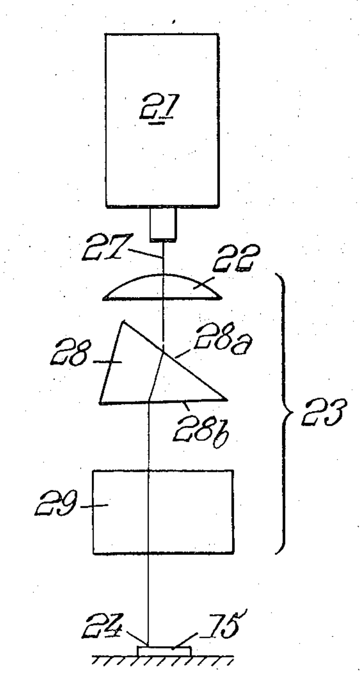
Figure 4:
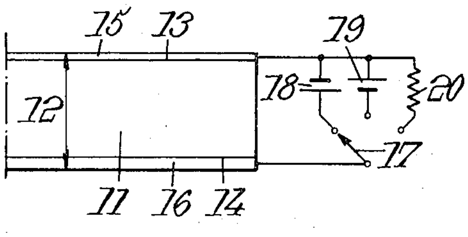
Figure 5:
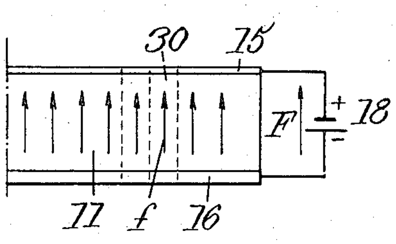
Figure 6:
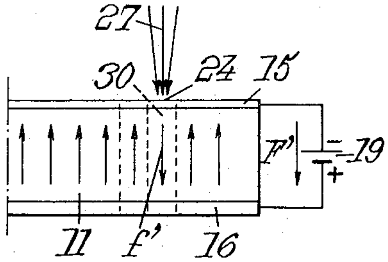
Figure 7:
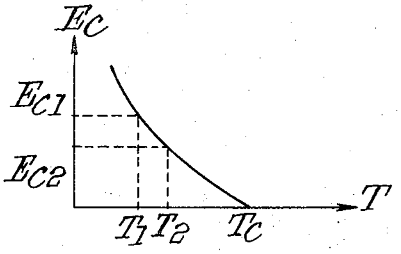
Figure 8:
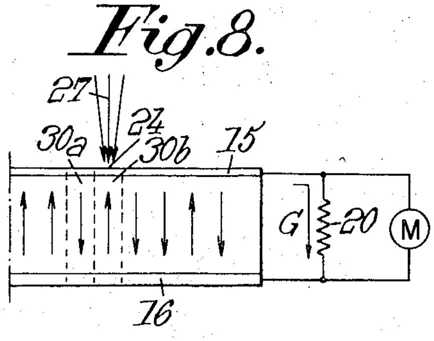
Figure 9:
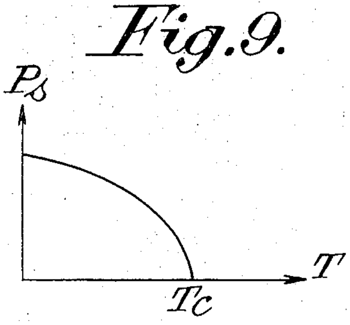
Figure 11:
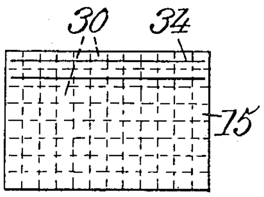
Figure 10:
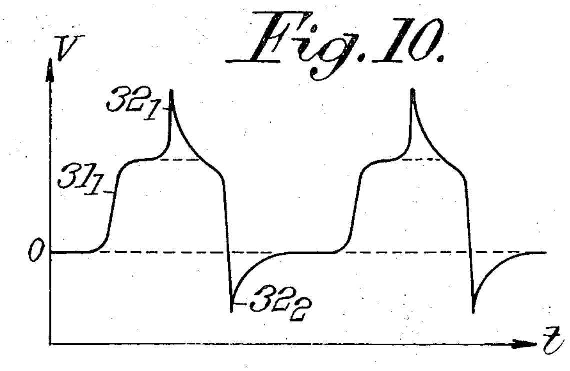

FIG. 1, already described, shows the state of the art;

FIG. 2 and 3, each of which is considered with reference to FIG. 4 drawn on an enlarged scale, illustrate two embodiments of a memory according to the invention;

FIGS. 5, 6 and 8 respectively depict the manner of preparation of the memory plate, the writing of a "1" thereon, and the reading thereof;

FIGS. 7 and 9 graphically portray the variations of the coercive force $E_C$ and the polarization $P_S$ as a function of the temperature T;

FIG. 10 shows the reading response time with sensitivity-increasing peaks, time *t* being represented along the X-axis and voltage V along the Y-axis;

and FIG. 11 is a top view of the manner of division of the upper face of the plate into elemental domains and the manner of scanning the same in succession.

Reference is first had to FIGS. 2 to 4, in which the memory device is shown as comprising a thin plate 11 made of a ferroelectric material such as triglycine sulfate, some other ferroelectric crystal, a ferroelectric ceramic, or a ferroelectric plastic film. Plate 11 is cut at right angles to its ferroelectric axis 12 and is metallized over its upper and lower larger faces 13 and 14 perpendicular to axis 12. In the particular example considered herein, the thickness of the plate is approximately 20 to 50 microns, the upper metallization film 15 is a few thousand Angstroms thick, and the lower metallized film 16 is a few microns thick. The metallizing may be obtained with gold, for instance, in which case the upper film will have a square resistance of approximately 400 ohms.

A selector switch 17 allows connecting as required, across the metallized films 15 and 16, a first voltage source 18 utilized for preparing the plate 11 for subsequent writings, a second voltage source 19 for permitting writings on plate 11, and a resistor 20 for reading the data written on the plate.

The memory device further includes, both for writing and reading, a laser 21 such as a helium-neon gas laser operating in the region of the red, a condenser 22, and means 23 for scanning, with the spot 24 focused by condenser 22, the entire surface of the metallized film 15 of plate 11, as will be explained hereinafter with reference to FIG. 11.

In the two forms of embodiment shown in FIGS. 2 and 3, the means 23 differ.

In the case of FIG. 2, the means 23 comprise two plane slabs 25, 26 rotatable about their mutually perpendicular axes 25*a* and 26*a*. Each slab 25 or 26 allows deflecting the laser beam 27 through a distance *d* proportional to the rotation angle of the plate. Thus slab 25 permits scanning along individual lines, while the slower rotation of slab 26 permits transition from one scanning line to the next, the entire scanning process taking place roughly as in a television system and ultimately covering the entire useful surface of plate 11 (see FIG. 11).

In the case of FIG. 2, the scanning is done mechanically, means having to be provided to rotate the slabs 25 and 26. For this reason the scanning cannot be effected very rapidly, and in order therefore to increase the scanning speed an electrically controlled scanning system of the kind shown in FIG. 3 may be provided, in which the scanning means 23 are formed by two fixed prisms 28, 29, the refraction index of each of which is modifiable by applying an electric field across its two faces (28*a* and 28*b* in the case of prism 28). Such prism systems utilizing the Kerr or Pockels effect are well-known in the electrooptics art.

In the two embodiments shown in FIGS. 2 and 3, the scanning is effected by shifting the laser beam while the plate 11 remains stationary. Manifestly, in an alternative embodiment (not shown) the laser beam could be stationary (the means 23 being dispensed with) and the plate 11 could be moved along the two coordinate axes at right angles to the ferroelectric axis 12 whereby to fetch the different memory cells or points of plate 11 beneath the laser spot 24.

In all cases the scanning is effected intermittently, the laser spot 24 being arrested over each cell.

Lastly, the memory device includes means (not shown) for cutting off the laser beam 27, such means consisting either of means for controlling the excitation of the laser 21 or of means for occluding the laser beam 27, and means (likewise not shown) for detecting the flow and direction of a current through the resistor 20.

The structure of a ferroelectric memory device according to this invention having been thus described, it is now proposed to explain, with reference to FIGS. 5 – 10, the manner of writing and reading bits on said memory device after initial preparation of the plate 11.

The first step is to prepare the plate by applying, across the metallized films 15 and 16, that voltage of source 18 which has a value and direction such that it polarizes all the elemental domains on ferroelectric plate 11 in the sense of arrow F (in FIG. 5 the plate 11 is shown as having been prepared with the polarization vector *f* of each domain 30 aligned in the direction F).

By definition, when the polarization vector *f* of a domain is oriented in the direction of arrow F it is taken to correspond to a "0." A plate 11 prepared thus accordingly carries only "0" bits on all its writing cells.

The source 18 accordingly has its positive pole connected to film 15 and its negative pole to film 16, the voltage of the source being of the order of 500 volts per tenth of a millimetre of plate thickness. In a preferred alternative embodiment, the plate is prepared using a source of lower potential, in which case the temperature of the plate must be raised by heating or irradiation to approximately 60° C (the coercive force being cancelled above the Curie temperature — 50° C in the case of triglycine sulfate — see FIG. 7), after which the plate must be cooled while continuing to maintain the electric polarizing field.

Having been prepared as disclosed above, the plate is then ready for data bits, and more particularly "1" bits, to be written on the desired memory cells.

As illustrated in FIG. 6, writing is effected by simultaneously applying:

- a voltage across metallized films 15 and 16, said voltage, which is produced by switching in the source 19, being applied in the direction of arrow F′ opposite to the direction of arrow F in FIG. 5 and having a value of approximately 50 volts per tenth of a millimetre of thickness of plate 11,
- and, in order to write a "1," the focused spot 24 of a laser beam 27 on metallized film 15.

This simultaneous application causes the polarization vector of the domain on plate 11 located beneath the spot 24 to switch from the direction F to the direction F′, as shown in the case of the polarization vector *f*′. This switch is probably due to the reduction in coercive force caused by the intense illumination.

FIG. 7 graphically depicts the pattern of variation of the coercive force $E_C$ with the temperature T, which shows that the coercive force diminishes with rising temperature (ultimately reaching zero for a certain temperature $T_C$ known as the Curie temperature). The illumination by the concentrated laser beam of domain 30 beneath the laser spot 24 causes the temperature of this domain to rise and the coercive force to consequently decrease, thereby permitting easier switching of the domain 30 responsively to the electric field produced by source 19. Thus it will be appreciated that the intensity of the laser radiation, on the one hand, and the magnitude of the voltage on the other hand, must be adjusted so that:

- in the absence of laser radiation and hence of a temperature rise in the domain 30, the latter's polarization not be reversed by the electric field produced by the voltage applied by source 19 across metallized films 15 and 16,
- but that, in the event of illumination, the polarization of domain 30 be switched in response to said electric field.

The temperature rise must therefore be sufficient to produce a substantial variation in the coercive force, for instance from $E_{C1}$ to $E_{C2}$ for a temperature rise from $T_1$ to $T_2$ (FIG. 7). However the electric field must be slightly below the value which would produce switching if there were no laser radiation.

Thus, in the specific embodiment considered herein, the intensity of illumination which caused the polarization of the domain to switch, and a "1" to be accordingly written, was of the order of 100 watts/cm$^2$, whereas the voltage was 25 volts for a plate 0.05 mm thick. If, on the contrary, it is required to write a "0", the domain on which the "0" is to be written must not be illuminated so that no switching takes place, the intensity of illumination being then 0 watt.

In addition, the inventors have observed that it is preferable to modulate the amplitude of the illumination at a frequency lying, say, between 1 kHz and 1 MHz.

Reference to FIGS. 8 and 9 will now be had in order to explain the process of reading a memory, into the different elemental cells of which "zeroes" and "ones" have been written. In FIG. 8, for example, the cell corresponding to domain 30*a* carries a "1," while the cell formed by domain 30*b* carries a "0."

The reading process consists in connecting resistor 20 across films 15 and 16 and illuminating the domain or cell to be "read" by means of laser beam 27 and focusing the spot 24 thereof over said domain. If required, a small voltage may be applied across films 15 and 16, but this is by no means essential.

In the event of illumination, the degree of polarization of the illuminated domain (such as 30*b*) varies as a result of the pyroelectric effect. FIG. 9 shows how the polarization $P_S$ varies as a function of the temperature T, ultimately decreasing to zero at the Curie temperature $T_C$ (which is the same as the temperature in FIG. 7). This temperature $T_C$ is approximately 50° C for triglycine sulfate.

To a degree of polarization $P_S$ corresponds a density of surface charges over the domain 30*b* equal to $P_S$.

This density of positive charges in film 15 and negative charges in film 16 in the case of the domain 30*b*, corresponding to the writing of a "0, " produces an electric current through the resistor 20, the intensity of which is proportional to the charge density (hence to $P_S$) and to the area of the domain, said current flowing through resistor 20 in the direction shown by arrow G. If, on the contrary, a domain such as 30*a* onto which a "1" had been written were to be illuminated, then the film 16 would carry positive charges and the film 15 negative charges, thus causing a current to flow through resistor 20 in the opposite direction to arrow G. It will therefore be readily appreciated that, providing the presence and above all the direction of the current through resistor 20, or rather through the electric circuit containing it, can be detected by means, say, of a galvanometer or an electronic amplifying device series-connected to resistor 20, it is possible to know whether the domain over which the laser beam is located has had a " 1" or else a "0" written on it.

It is to be noted that in principle readings are effected without applying an electric field, thereby avoiding changes in the direction of polarization of the domains being read, and this even in the event of repeated readings. Thus the reading process is non-destructive.

The lower the value of the resistor 20, the shorter the response time and therefore the faster the speed at which the domains can be scanned in succession by the laser beam, though in that case the reading signal will be weaker. A good compromise may be adopted by using a resistor of about 1,000 ohms.

The inventors have additionally observed that, at least in the case of triglycine sulfate, the reading signal includes, in addition to the normal pulses $\mathbf{31}_1$ corresponding to a "1," peaks $\mathbf{32}_1$ and $\mathbf{32}_2$ which increase the sensitivity enormously (see FIG. 10). The reason for these peaks has not yet been fully elucidated, but it would appear that the additional signal represented by these peaks corresponds to a reversible switching of the domains responsively to illumination by the laser spot 24. Under certain conditions, the peaks 32 will allow the strength of the reading signal to be multiplied tenfold when the spot 24 is intense enough. This makes it possible to reduce the value of the resistor 20 for a given reading sensitivity, and to consequently increase the scanning speed during readings, thus resulting in valuable time saving. In fact it has been found possible to achieve reading speeds of a few microseconds per bit.

Lastly, FIG. 11 depicts the plate 11 with its upper film 15 in plan view in order to clearly represent the disposition of the different domains 30 forming a rectangular matrix of storage points or cells. Each cell is determined by the dimension of the spot 24, which for example may be of the order of 10 microns in diameter (for clarity in FIG. 11, domains of square, not circular, section are shown). In the course of their experiments, the inventors observed that individually switchable elemental domains could have sections of approximately 10 microns in diameter without causing interference between adjacent domains in the same scanning line or in successive lines. This being so, a plate with a useful surface area measuring 50 × 50mm is capable of storing 5,000 × 5,000 = 25,000,000 bits with only two electrodes formed by the films 15 and 16, as opposed to the 5000 + 5000 = 10,000 conductors B and C which would be required in the prior art memory matrix shown in FIG. 1.

Considering next the scanning process, this is effected along lines of type 34, the laser spot 24 moving successively over the different cells in a line, after which, upon completion of that line, scanning starts again along the next line, either in the same direction or in the opposite direction.

It will therefore readily be appreciated that a ferroelectric memory device according to this invention offers numerous advantages, including the following in particular:

- ease of manufacture, through the use of only two electrodes;
- high storage capacity, by virtue of the high density of writing and reading cells per square centimetre;
- extremely easy writing and reading, merely requiring scanning by means of a concentrated laser beam and connection across the two electrodes either of a voltage source or of a resistor associated to means for detecting the flow and direction of the current therethrough;
- the possibility of rapidly erasing the whole memory;
- the possibility of reading the memory a great number of times without loss of information since it is not a volatile storage;
- high-speed reading, at the rate of as much as a few microseconds per bit.

The memory device according to the present invention can be used not only as a high-speed memory in a computer or a telephone exchange, but also in other data or information processing units, as well as for displaying information digitally or graphically. It may be used likewise for type-setting.

It goes without saying that changes and substitutions may be made in the specific forms of embodiment hereinbefore disclosed, without departing from the scope of the invention.

What we claim is:

1. A ferroelectric memory device, characterized by the fact that it includes, in combination, a thin plate made of a ferroelectric material cut at right angles to its ferroelectric axis and metallized directly on its two larger faces perpendicular thereto, means for applying at will across said two faces a first or a second voltage of different values and opposite senses, a load resistor connectable across the two metallized faces of the plate, means for focusing the spot of a laser beam of desired intensity to reach a focus directly on one of the two metallized faces constituting an active face of the plate and for scanning said active face of the plate with said spot, said laser beam being utilized both for writing and reading information on said memory device, means for occluding said laser spot during writing, and means for detecting the flow and direction of a current through said resistor when the same is connected across said two faces.

2. A ferroelectric memory device according to claim 1, wherein the second voltage which is applied in the opposite direction to the first voltage, has a value such that it is slightly less than the coercive-force value for which the polarizations of the elemental domains on the plate would be switched, the intensity of the laser radiation concentrated onto a domain allowing the coercive force to be reduced during application of the second voltage until the polarization of the illuminated domain is switched.

3. A ferroelectric memory device according to claim 1 wherein the plate is made of triglycine sulfate.

4. A ferroelectric memory device according to claim 1, wherein the scanning effect with the laser beam spot is obtained by means of two prisms utilizing the Kerr or Pockels effect.

5. A ferroelectric memory device according to claim 1, wherein the plate is a few tens of microns thick, the metallized film on the active surface is approximately a few thousand Angstroms thick and the other metallized film is a few microns thick.

6. A ferroelectric memory device according to claim 1, wherein the first voltage is of sufficient value so that, when applied across the two faces, it causes polarization of all the plate domains in the same direction.

7. A ferroelectric memory device according to claim 1, wherein the first voltage is approximately 500 volts per tenth of a millimetre of plate thickness and that the second voltage is approximately 50 volts per tenth of a millimetre of plate thickness.

8. A ferroelectric memory device according to claim 1, wherein the resistor has a value of the order of one thousand ohms.

9. A method of utilizing a ferroelectric memory device including in combination a thin plate made of a ferroelectric material cut at right angles to its ferroelectric axis and metallized directly on its two larger faces perpendicular thereto, means for applying at will across said two faces a first or a second voltage of different values and opposite senses, a load resistor connectable across the two metallized faces of the plate, means for focusing the spot of a laser beam of desired intensity to reach a focus directly on one of the two metallized faces constituting an active face of the plate and for scanning said active face of the plate with said spot, said laser beam being utilised both for writing and reading information on said memory device, means for occluding said laser spot during writing, and means for detecting the flow and direction of a current through said resistor when the same is connected across said two faces for writing and reading information in the form of "0" or "1" binary digits on said memory, comprising the steps of:

- applying, across the metallized faces, the first voltage which is the higher of the two, whereby to polarize all the ferroelectric domains of the plate in the same direction,
- writing one of the two binary digits by applying, on the one hand, the second voltage of opposite direction to the first voltage across the metallized faces and, on the other hand, the laser beam spot on that memory cell constituted by the point on the active face upon which it is required to write said binary digit, and, if desired, occluding the laser spot, whereby to cause, when the laser spot is unoccluded, the ferroelectric domain beneath said spot to switch from its previous direction of polarization to the opposite direction of polarization,
- and of effecting reading, on the one hand, by directing the laser beam at the cell or point to be read, and on the other hand by connecting said resistor accross the two metallized faces whereby to cause a current to flow therethrough, the direction of said current, which depends on the direction of polarization of the ferroelectric domain beneath the laser beam spot, indicating the binary digit written on said cell or point the reading being effected with means for detecting the flow and direction of a current.

* * * * *